(12) United States Patent
Watanabe

(10) Patent No.: US 8,280,737 B2
(45) Date of Patent: Oct. 2, 2012

(54) SOUND SIGNAL GENERATING METHOD, SOUND SIGNAL GENERATING DEVICE, AND RECORDING MEDIUM

(75) Inventor: Kazuhiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 233 days.

(21) Appl. No.: 12/703,394

(22) Filed: Feb. 10, 2010

(65) Prior Publication Data

US 2010/0145690 A1 Jun. 10, 2010

Related U.S. Application Data

(63) Continuation of application No. PCT/JP2007/067377, filed on Sep. 6, 2007.

(51) Int. Cl.

| | |
|---|---|
| ***G06F 15/00*** | (2006.01) |
| ***G10L 11/00*** | (2006.01) |
| ***G10L 19/00*** | (2006.01) |
| ***G10L 13/00*** | (2006.01) |
| ***G10L 13/08*** | (2006.01) |

(52) U.S. Cl. ..................... 704/258; 704/200; 704/200.1; 704/260

(58) Field of Classification Search .................. 704/258, 704/260, 200, 200.1

See application file for complete search history.

(56) References Cited

U.S. PATENT DOCUMENTS

| | | | | |
|---|---|---|---|---|
| 4,200,810 A * | 4/1980 | Cain et al. | 327/174 |
| 4,672,667 A * | 6/1987 | Scott et al. | 704/231 |
| 5,678,221 A * | 10/1997 | Cahill | 455/312 |
| 5,810,600 A * | 9/1998 | Okada | 434/185 |
| 5,864,812 A | 1/1999 | Kamai et al. | |
| 6,169,240 B1 | 1/2001 | Suzuki | |
| 6,453,283 B1 * | 9/2002 | Gigi | 704/207 |
| 2005/0171778 A1 | 8/2005 | Sasaki et al. | |
| 2006/0178873 A1 * | 8/2006 | Gigi | 704/207 |

FOREIGN PATENT DOCUMENTS

| | | |
|---|---|---|
| CN | 1682278 | 10/2005 |
| JP | A 4-253100 | 9/1992 |
| JP | A 8-160991 | 6/1996 |
| JP | 08-335095 | 12/1996 |
| JP | A 9-325798 | 12/1997 |
| JP | A 10-214100 | 8/1998 |

(Continued)

OTHER PUBLICATIONS

Chinese Office Action mailed Apr. 21, 2011 (with English translation) in corresponding Chinese Patent Application No. 200780100514.2.

(Continued)

*Primary Examiner* — Eric Yen

(74) *Attorney, Agent, or Firm* — Greer, Burns & Crain, Ltd.

(57) ABSTRACT

A sound signal generating method includes: generating, using a computer, a plurality of unit waveform signals by dividing the original sound signal having a periodic length of repeating similar waveforms by the length of the waveform; generating, using a computer, a repetitive waveform signal for each of the generated unit waveform signals by repeating the waveform of the unit waveform signal a given number of times; and generating, using a computer, an outputsound signal by shifting each of the repetitive waveform signals in each length with a sequence in which the unit waveform signals form the original sound signal and then superimposing on one another.

10 Claims, 10 Drawing Sheets

FOREIGN PATENT DOCUMENTS

| | | |
|---|---|---|
| JP | A 10-307586 | 11/1998 |
| JP | A 2002-244693 | 8/2002 |
| JP | A 2004-62002 | 2/2004 |
| JP | 2006-220806 | 8/2006 |
| WO | WO 99/59139 | 11/1999 |
| WO | WO 2004/027753 | 4/2004 |
| WO | WO 2004/066271 A1 | 8/2004 |

OTHER PUBLICATIONS

Japanese Office Action issued in corresponding Japanese App. No. 2009-531057, mailed Jan. 10, 2012.

* cited by examiner

Δa

SOUND SIGNAL GENERATING METHOD, SOUND SIGNAL GENERATING DEVICE, AND RECORDING MEDIUM

CROSS-REFERENCE TO RELATED APPLICATIONS

This application is a continuation, filed under U.S.C. §111 (a), of PCT International Application No. PCT/JP2007/067377 which has an international filing date of Sep. 6, 2007 and designated the United States of America.

FIELD

The embodiments discussed herein are related to a sound signal generating method for generating a processed sound signal by processing an original sound signal, and to a sound signal generating device adopting the sound signal generating method, and a recording medium storing a computer program for implementing the sound signal generating device.

BACKGROUND

In recent years, a function of reading aloud text data from mails and website contents using a voice is incorporated into embedded equipment such as cellular phones. In a speech synthesis process for realizing such a read-aloud function using a voice, a waveform dictionary as a database storing speech segment data necessary for synthesized speech by compressing the data with the use of a compression method such as ADPCM (Adaptive Differential Pulse Code Modulation) is preliminary recorded in recording means such as a built-in memory. When generating a synthesized speech waveform, a compressed speech segment data read from the wave function dictionary is expanded and decoded. Then synthesized speech is outputted on the basis of the generated speech signal by performing processes, such as combining the expanded and decoded speech segment data and adjusting the pitch and speed.

According to the Japanese Laid-open Patent Publication No. H08-160991, a speech-segment production method and a speech synthesis method are discussed.

However, the expansion and decoding of a speech signal compressed by a compression method such as ADPCM sometimes cause deterioration in the sound quality of the generated speech, such as noise and non-smoothness. Moreover, deterioration in sound quality, such as noise and non-smoothness, may also occur when combining a plurality of speech segment data and adjusting the pitch and speed of speech.

SUMMARY

According to an aspect of the embodiments, a sound signal generating method includes: generating, using a computer, a plurality of unit waveform signals by dividing the original sound signal having a periodic length of repeating similar waveforms by the length of the waveform; generating, using a computer, a repetitive waveform signal for each of the generated unit waveform signals by repeating the waveform of the unit waveform signal a given number of times; and generating, using a computer, an output sound signal by shifting each of the repetitive waveform signals in each length with a sequence in which the unit waveform signals form the original sound signal and then superimposing on one another.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

DESCRIPTION OF EMBODIMENTS

Figure 1A:
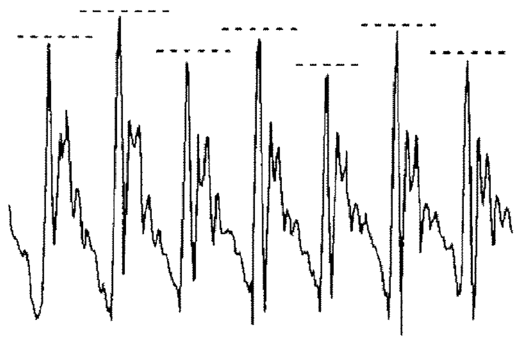
FIGS. 1A-1B are graphs representing the waveform of a generated speech signal.
Figure 1B:
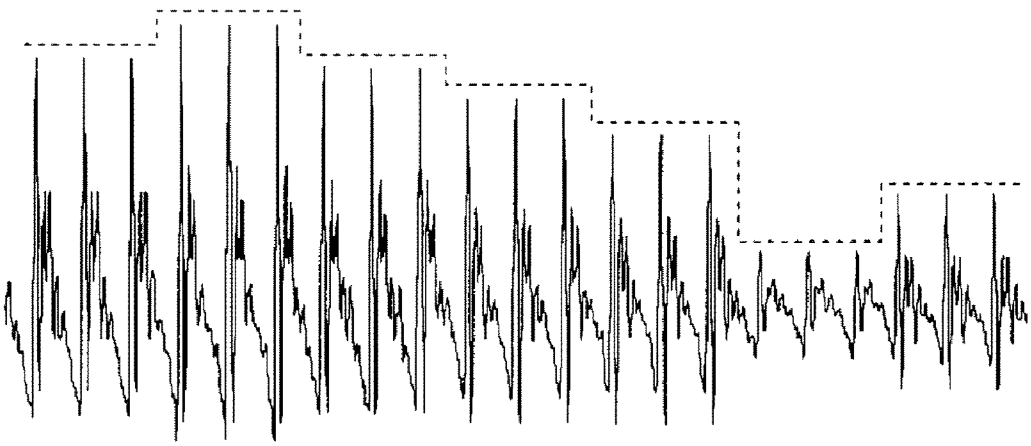

FIGS. 1A-1B are graphs representing the waveforms of generated speech signals. FIG. 1A illustrates the waveform of a speech signal generated by expanding and decoding a compressed speech signal, in which the amplitude in each length of the periodic waveform of the generated speech signal varies due to noise caused when compressing and expanding with the use of irreversible compression. Such a variation in the respective lengths and non-smooth changes cause deterioration, such as noise and non-smoothness, in the sound quality of synthesized speech on the basis of the generated speech signal.

FIG. 1B illustrates the waveform of a speech signal generated by reducing the speed of speech, so-called conversation speed, in which the speech signal at a reduced conversation speed is generated by repeating the speech signal of the same speech segment in each length a given number of times. In the case of such a speech signal, the amplitude of each waveform changes in a step-like manner, thus causing deterioration in sound quality.

As a method for preventing such deterioration in sound quality, there is a method of preventing noise due to irreversible compression by reducing the compression ratio for compression. Moreover, there is a method of preventing deterioration in sound quality by performing a noise elimination process on a spectrum generated by converting the synthesized speech signal into components along the frequency axis with the use of a short-time FFT process and then converting the components back into the speech signal along the original time axis.

However, the method that reduces the compression ratio has a problem that a larger memory capacity is required for the waveform dictionary, and the method that eliminates noise by frequency conversion has a problem that the processing load is increased. These problems are not ignorable when the read-aloud function is incorporated into embedded equipment that has great limitations in the memory capacity and processing ability, such as a cellular phone. Further, from the view point of reducing power consumption in a computation process, it is desirable to solve the above problems.

The present embodiment has been made to solve these problems, and it is an object of the embodiment to provide a sound signal generating method capable of reducing deterioration in sound quality caused by the compression, expansion, speech synthesis processes and the like by a small amount of processing without deteriorating the original sound quality, and to provide a sound signal generating device adopting the sound signal generating method, and a recording medium storing a computer program for implementing the sound signal generating device.

Figure 2:
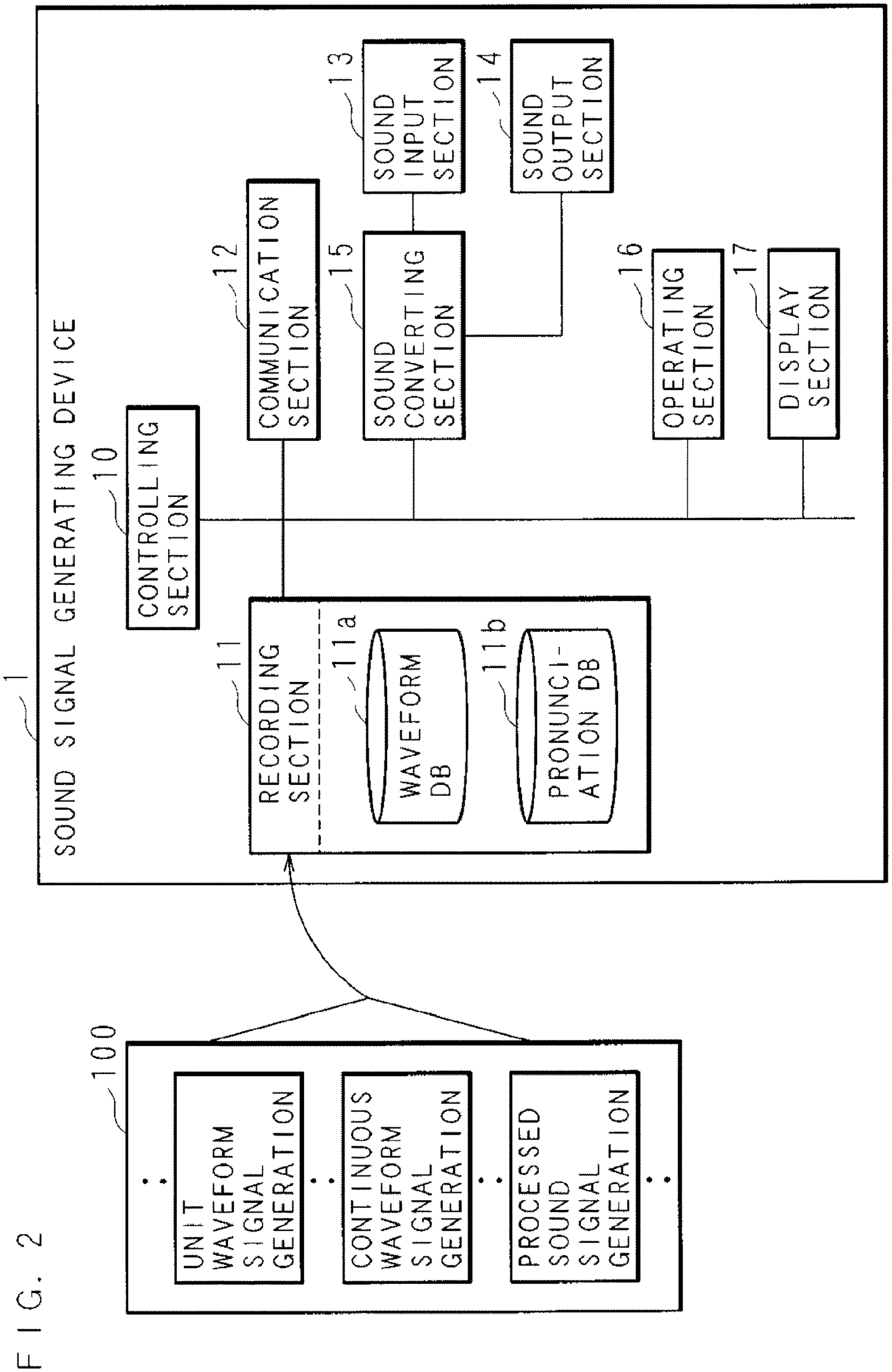
FIG. 2 is a block diagram illustrating a structural example of a sound signal generating device of the present embodiment.

The following will explain the present embodiment in detail on the basis of the drawings illustrating an embodiment thereof. FIG. 2 is a block diagram illustrating a structural example of a sound signal generating device of the present embodiment. 1 in FIG. 2 represents the sound signal generating device of the present embodiment using a computer such as a cellular phone, and the sound signal generating device 1 includes a controlling section 10 such as a CPU for controlling the entire device; and a recording section 11 such as a ROM and a RAM recording a computer program 100 of the present embodiment, which is executed under the control of the control section 10, and information including various types of data. By executing the computer program 100 of the present embodiment recorded in the recording section 11 under the control of the controlling section 10, the computer such as a cellular phone operates as the sound signal generating device 1 of the present embodiment. A part of the recording area of the recording section 11 is used as various types of databases, such as a waveform database (waveform DB) 11*a* called a waveform dictionary storing data representing sound signals such as speech segment data necessary for generating synthesized speech by compressing the data with the use of a compression method such as ADPCM; and a pronunciation database (pronunciation DB) 11*b* recording the way of pronouncing Chinese characters, Japanese alphabetical characters, English words and the like. It may be preferable to increase the capacity and speed by using a memory chip exclusively for databases instead of using a part of the recording area of the recording section 11 for various types of databases. Since the sound signal generating device 1 of the present embodiment executes the process for processing the waveform of a sound signal, a sound signal recorded in the waveform database 11*a* will be referred to as the original sound signal and the sound signal after being processed will be referred to as the processed sound signal in the following explanation.

Moreover, the sound signal generating device 1 includes a communication section 12 such as an antenna and its attachment devices functioning as a communication interface; a sound input section 13 such as a microphone; a sound output section 14 such as a speaker; and a sound converting section 15 for performing a sound signal conversion process. The conversion process performed by the sound converting section 15 includes the process of converting a sound signal as an analog signal received by the sound signal input section 13 into a digital signal, and the process of converting the digital signal into an analog signal to be outputted from the sound signal output section 14. Furthermore, the sound signal generating device 1 includes an operating section 16 for receiving operations entered through keys such as alphanumerical characters and various commands; and a display section 17 such as a liquid crystal display for displaying various types of information.

Here, the embodiment in which the sound signal generating device 1 is implemented using a cellular phone is illustrated, but the present embodiment is not limited to this and may be implemented in various types of computers, such as a personal computer having a function of outputting sounds such as synthesized speech. For example, in the case where the present embodiment is implemented in a personal computer, the computer program 100 of the present embodiment is read from a recording medium such as a CD-ROM by an auxiliary memory section such as a CD-ROM drive and it is recorded in the recording section 11 such as a hard disk. Then, by executing the computer program 100 recorded in the recording section 11 with the controlling section 10, the sound signal generating device 1 of the present embodiment is implemented.

Figure 3:
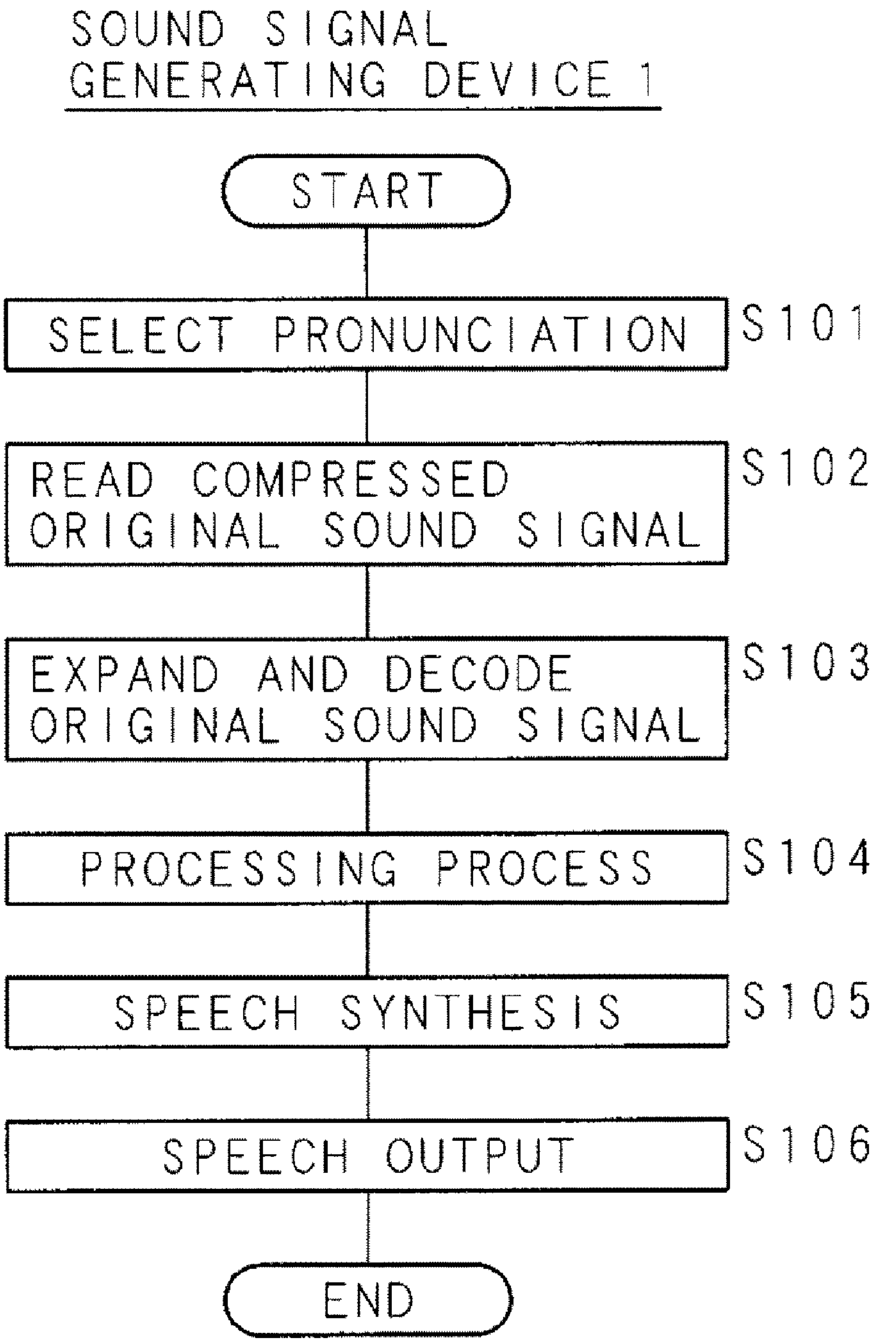
FIG. 3 is an operation chart illustrating one example of a speech output process performed by the sound signal generating device of the present embodiment.

Next, the processes performed by the sound signal generating device 1 of the present embodiment will be explained. FIG. 3 is an operation chart illustrating one example of a speech output process performed by the sound signal generating device 1 of the present embodiment. The sound signal generating device 1 executes a synthesized speech output process in order to read aloud text data from a mail or website content, for example, in a voice. Under the control of the controlling section 10 executing the computer program 100 recorded in the recording section 11, the sound signal generating device 1 reads text data, selects a pronunciation of the read text data from the pronunciation database 11*b* (S101), selects and reads compressed original sound signal data corresponding to the selected pronunciation from the waveform database 11*a* (S102), and expands and decodes the read original sound signal data (S103).

Then, under the control of the controlling section 10, the sound signal generating device 1 executes a processing process of generating a processed sound signal by processing the expanded and decoded original sound signal data (S104). The processing process at step S104 is a smoothing process for averaging time changes in the waveform of the original sound signal in each length and a process of improving sound quality such as elimination of noise. The processing process will be described in detail later.

Under the control of the controlling section 10, the sound signal generating device 1 performs a speech synthesis process for synthesizing a speech signal on the basis of the processed sound signal (S105), and outputs speech on the basis of the synthesized speech signal from the sound output section 14 (S106). The sound output process is executed in this manner.

Figure 4:
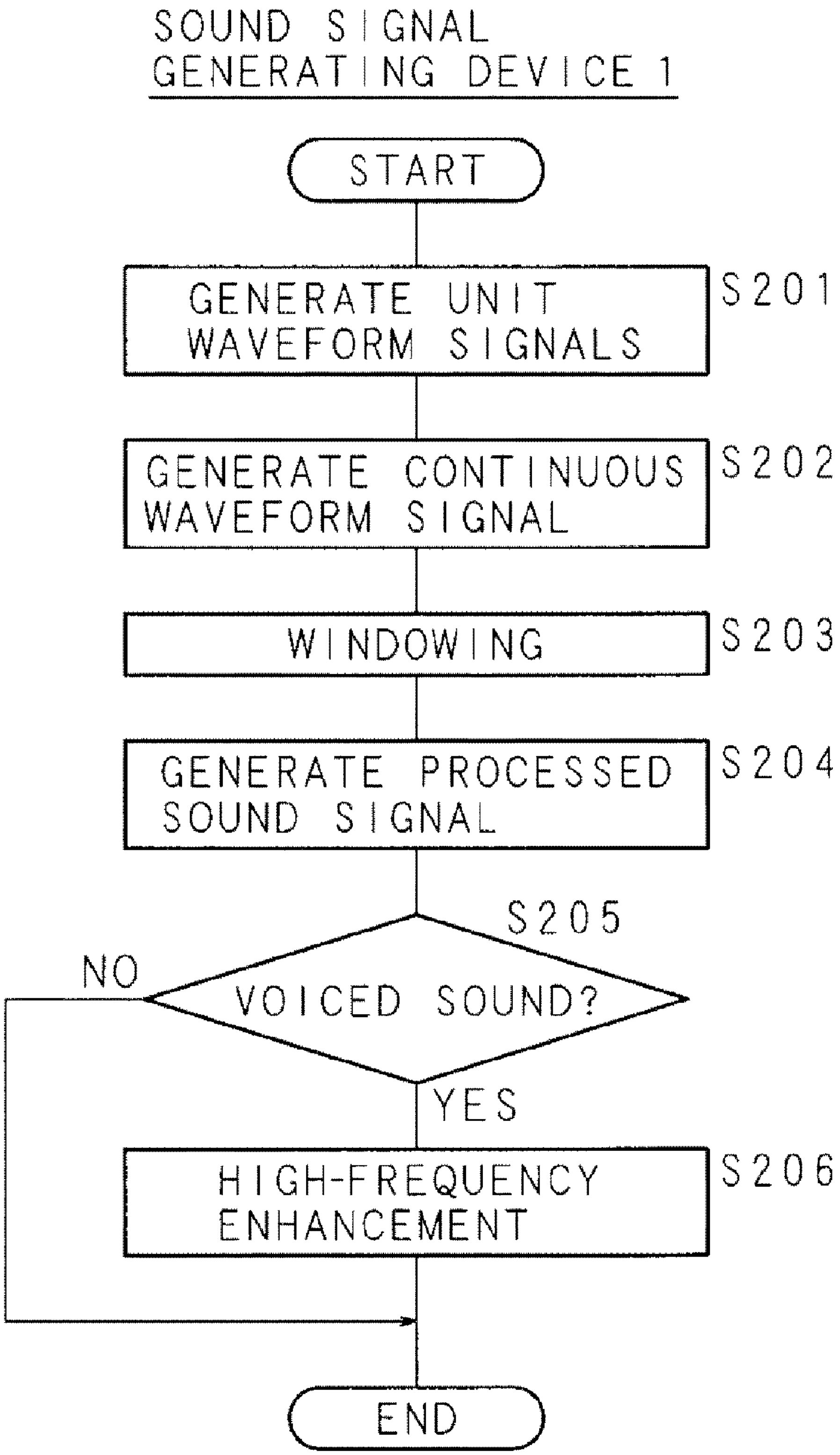
FIG. 4 is an operation chart illustrating one example of a processing process performed by the sound signal generating device of the present embodiment.

FIG. 4 is an operation chart illustrating one example of a processing process performed by the sound signal generating device 1 of the present embodiment. Under the control of the controlling section 10 executing the computer program 100 recorded in the recording section 11, the sound signal generating device 1 divides a read original sound signal in a length of the waveform to generate a plurality of unit waveform signals (S201). The sound signal generating device 1 recognizes the length of the waveform of the original sound signal on the basis of information indicating the length of the original sound signal prerecorded in the waveform database 11*a*, but the length of the waveform of the original sound signal may also be detectable from the waveform itself, such as from the intervals of peaks of the waveform, and waveform correlation.

Under the control of the controlling section 10, the sound signal generating device 1 generates a continuous waveform signal for each of the unit waveform signals by repeating the waveform of a unit waveform signal a given number of times such as five times (S202), and performs a windowing process on the generated continuous waveform signal by using a window function, such as the Hanning window function and the Hamming window function, (S203).

Further, under the control of the controlling section 10, the sound signal generating device 1 shifts the respective continuous waveform signals in each length with a sequence in which they form the original sound signal, and superimposes on one another to generate data of a processed sound signal (S204). For example, in the case where a continuous waveform signal is generated by repeating a unit waveform signal five times, the respective continuous waveform signals are displaced by each length and superimposed on one another to generate one length of waveform consisting of superimposed five successive lengths of waveform. Since this gives a shifting average of waveform in each length, it is the smoothing process for averaging the time changes in the waveform of the original sound signal in each length. Note that the windowing process with a suitably selected window function is performed when generating a continuous waveform signal from a unit waveform signal.

Under the control of the controlling section 10, the sound signal generating device 1 determines whether a segment of the original sound signal corresponding to a processed sound signal is a voiced sound or a voiceless sound (S205). The determination as to whether the segment is a voiced sound or a voiceless sound is made on the basis of, for example, information regarding the original sound signal which is prerecorded in the waveform database 11*a*.

When it is determined at the operation S205 that the segment is a voiced sound (S205: YES), then the sound signal generating device 1 performs a high-frequency enhancing process for enhancing the amplitude of the processed sound signal of not less than a given frequency by a high-frequency enhancement filter under the control of the controlling section 10 (S206). When it is determined at the operation S205 that the segment is a voiceless sound (S205: NO), the sound signal generating device 1 does not execute the high-frequency enhancing process at the operation S206. Since the processed sound signal generated at the operation S204 has the amplitude reduced in a high-frequency area, the original sound quality is retained by performing the high-frequency enhancing process. Note that since the voiceless sound does not have a significant reduction in the high-frequency area, the high-frequency enhancing process is not performed.

Figures 5A, 5B, 5C, 5D:
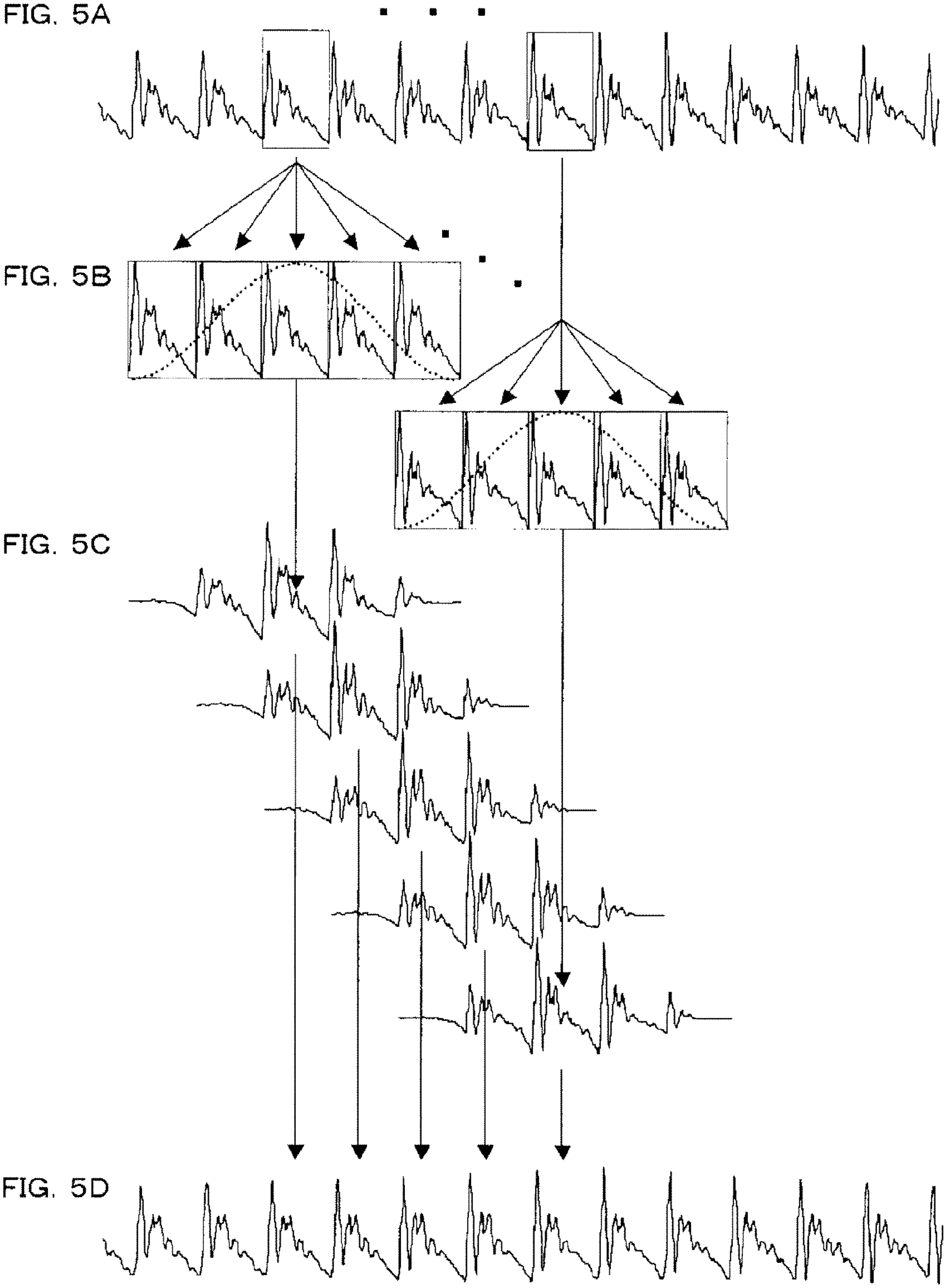
FIGS. 5A-5D are explanatory diagrams illustrating one example of waveform processing in the processing process performed by the sound signal generating device of the present embodiment.

Specific waveform processing performed in the processing process will be explained. FIGS. 5A-5D are explanatory diagrams illustrating one example of waveform processing in the processing process performed by the sound signal generating device 1 of the present embodiment. FIG. 5A indicates the time changes in the waveform of the original sound signal, and a rectangle indicated by the solid line represents a unit waveform signal separated by each length at the operation S201. Although only two unit waveform signals are illustrated with the solid lines for the sake of convenience, each of the waveforms separated by each length is processed as a unit waveform signal.

FIG. 5B illustrates a continuous waveform signal formed by making the unit waveform signal generated at the operation S202 continuous a given number of times. Illustrated in FIG. 5B is a continuous waveform signal formed by making a unit waveform signal represented by a solid-line rectangle in FIG. 5A continuous five times. The curve indicated by the dotted line in FIG. 5B represents the weight of a window function used in the windowing process at the operation S203 on the continuous waveform signal.

FIG. 5C illustrates conceptually a state in which the respective continuous waveform signals are shifted, that is, displaced by each length with a sequence in which they form the original sound signal at the operation S204, and FIG. 5D illustrates the waveform of a processed sound signal generated by superimposing the continuous waveform signals shifted by each length at the operation S204. The processing process is executed in this manner.

Figure 6:
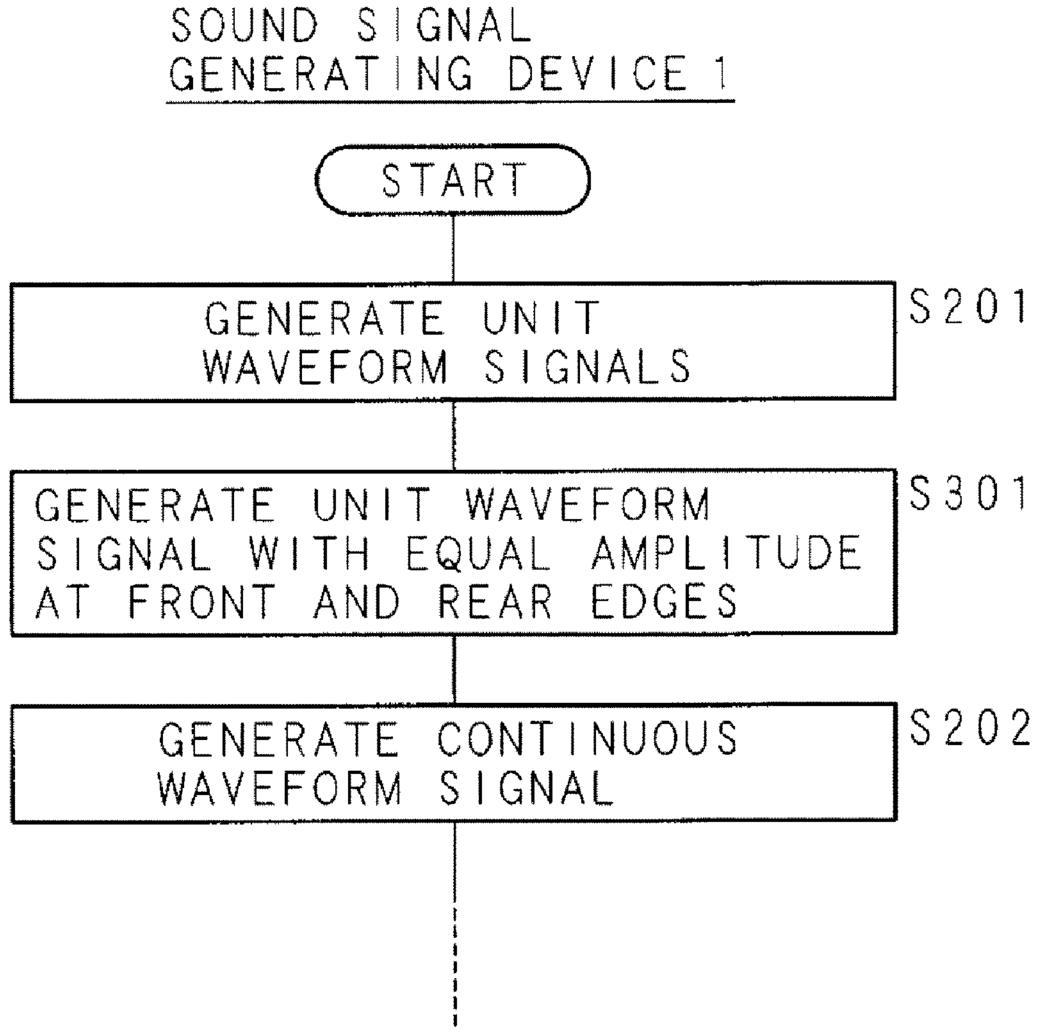
FIG. 6 is an operation chart illustrating one example of an edge process performed by the sound signal generating device of the present embodiment.

FIG. 6 is an operation chart illustrating one example of an edge process performed by the sound signal generating device 1 of the present embodiment. In the processing process illustrated using FIG. 4, it is possible to further suppress generation of noise by performing of the edge process to prevent a discontinuity in the section where the unit waveform signals are adjoined when a continuous waveform signal is generated at the operation S202 from a unit waveform signal generated at the operation step S201. Under the control of the controlling section 10, the sound signal generating device 1 generates unit waveform signals at the operation S201, and combines a plurality of the generated successive unit waveform signals with weighting to generate a unit waveform signal with equal amplitudes at the front and rear edges (S301). Then, using the generated unit waveform signal, the sound signal generating device 1 executes the process of generating a continuous waveform signal at the operation S202 and subsequent processes.

Figures 7A, 7B, 7C:
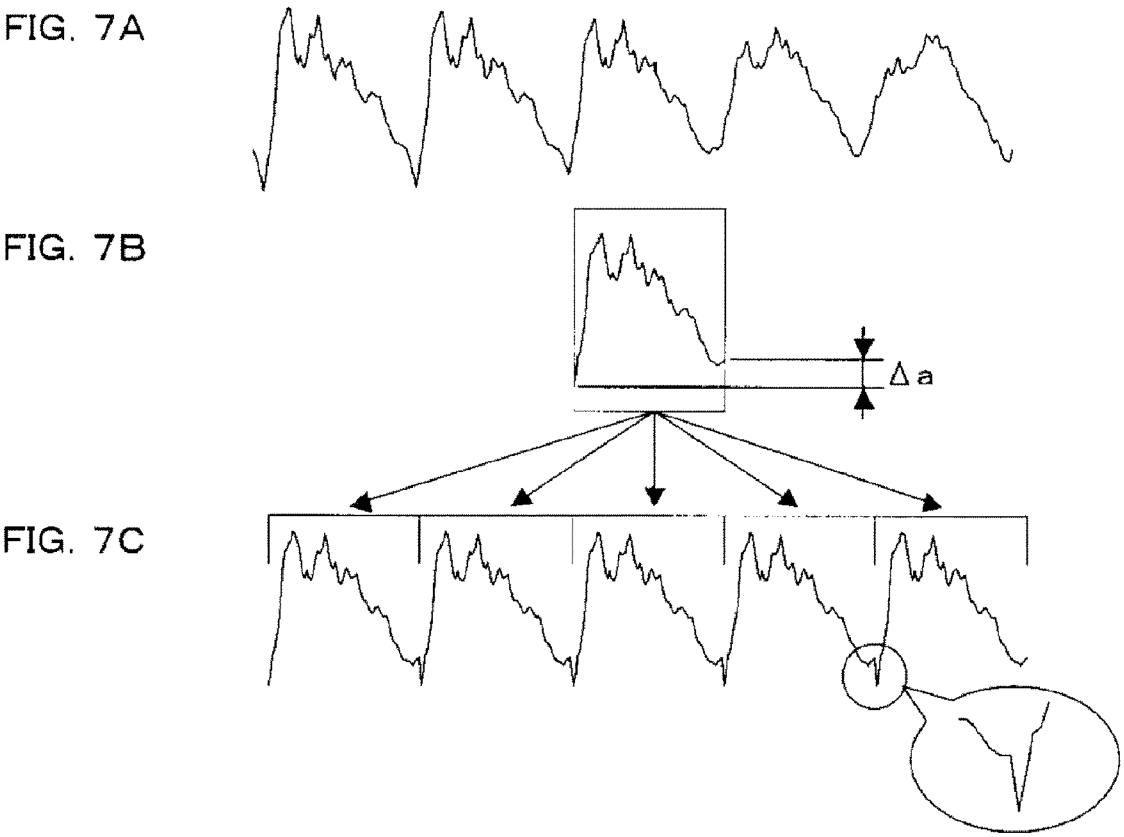
FIGS. 7A-7C are explanatory diagrams illustrating one example of processing the waveform of a continuous waveform signal when the edge process of the present embodiment is not performed.

Specific processing performed in the edge process will be explained. First, the following will explain the case where the edge process is not performed. FIGS. 7A-7C are explanatory diagrams illustrating one example of processing the waveform of a continuous waveform signal when the edge process of the present embodiment is not performed. FIG. 7A illustrates time changes in the waveform of the original sound signal, and FIG. 7B illustrates a unit waveform signal obtained by dividing by the length. The unit waveform signal illustrated in FIG. 7B has a difference indicated as Δa between the amplitudes of the front and rear edges. FIG. 7C illustrates a continuous waveform signal generated by making the unit waveform signal having the difference Δa between the amplitudes of the front and rear edges continuous. When the unit waveform signal having the difference Δa between the amplitudes of the front and end edges is made continuous as illustrated in FIG. 7C, the difference Δa exists in the section where the unit waveform signals are adjoined. Therefore a discontinuous state as zoomed in a balloon is present and consequently generates noise as a cause for deterioration in the sound quality due to generation of noise. The partition illustrated by the solid line in FIG. 7C indicates the partition of the unit waveform signals.

Figures 8A, 8B, 8C, 8D:
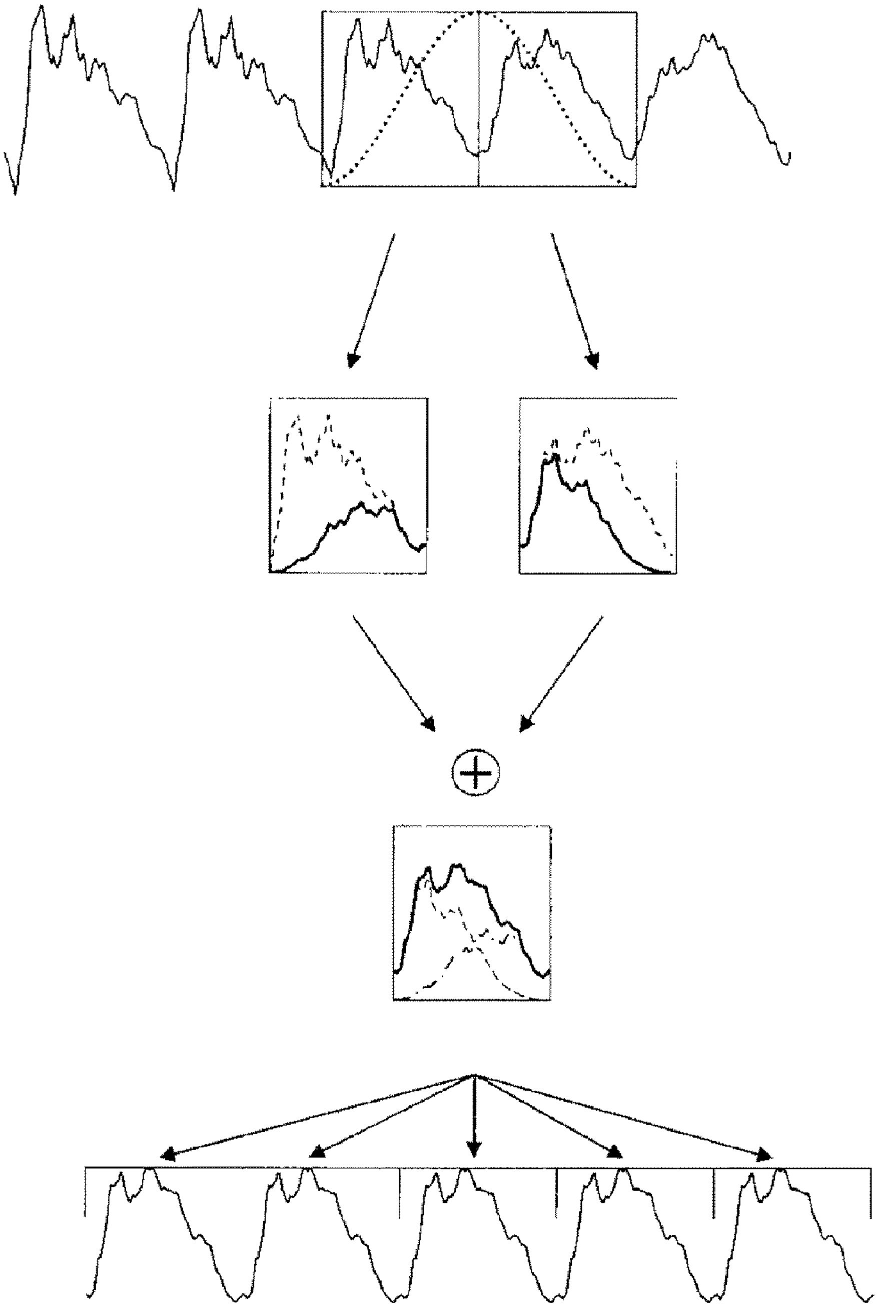
FIGS. 8A-8D are explanatory diagrams illustrating one example of waveform processing in the edge process performed by the sound signal generating device of the present embodiment.

FIGS. 8A-8D are explanatory diagrams illustrating one example of processing the waveform in the edge process performed by the sound signal generating device 1 of the present embodiment. FIG. 8(*a*) illustrates time changes in the waveform of the original sound signal, and, as indicated by the solid-line rectangles, the edge process is performed on an unit waveform signal as the subject of the edge process by using the another successive unit waveform signal immediately before the unit waveform signal. In FIG. 8A, an unit waveform signal as the subject of edge process and another unit waveform signal immediately before the unit waveform signal for use in the process are indicated with the solid-line rectangles. The curve illustrated by the dotted line in FIG. 8A indicates weights by which the respective unit waveform signals are to be multiplied, and, for example, a window function, such as the Hanning window that is one-valued and zero-valued at the section where the two unit waveform signals are joined and at the edges, respectively.

FIG. 8B illustrates a state in which each unit waveform signal is weighted, the dotted line indicates the waveform of the original unit waveform signal, and the solid line represents the unit waveform signal after being weighted.

FIG. 8C illustrates a combined state of the weighted unit waveform signals in which the dotted line and the one-dot and one-short-dash line indicate the two unit waveform signals before being combined, and the solid line represents the unit waveform signal after combined. The combined unit waveform signal is a unit waveform signal generated at the operation S301 and has a form almost similar to the original unit waveform signal with equal amplitudes at the front and rear edges.

FIG. 8D is a continuous waveform signal generated using the unit waveform signal generated by the edge process. Because of using the unit waveform signal whose amplitudes at the front and rear edges are made equal by the edge process, the continuous waveform signal has no discontinuity. Note that the partition indicated by the solid line in FIG. 8D represents the partition of the unit waveform signals.

Here, although the embodiment in which the edge process is performed on the basis of two unit waveform signals is illustrated, the present embodiment is not limited to this and may be embodied in various forms, such as one in which four successive unit waveforms are divided into two unit waveform signals, the edge process is performed on the basis of the two unit waveform signals, and then the edge process is further performed on the basis of the resultant two unit waveform signals. Moreover, various weighting functions may be used without limiting to the Hanning window. It's possible to use various weighting function that is one-valued and zero-valued at the section where two unit waveform signals are joined and at the edges, respectively, and has total weight with one for corresponding points The processing process and the edge process are executed in this manner.

The sound signal generating device 1 of the present embodiment may be used not only for eliminating noise caused when expanding and decoding of data in an original sound signal compressed in the above-described manner, but also for improving the sound quality of data in an original sound signal that is not compressed. Next, the following will explain a speech output process in which the processing process is performed on an un compressed original sound signal. Assume that in the speech output process, the uncompressed original sound signal data is recorded in the waveform database 11*a*.

Figure 9:
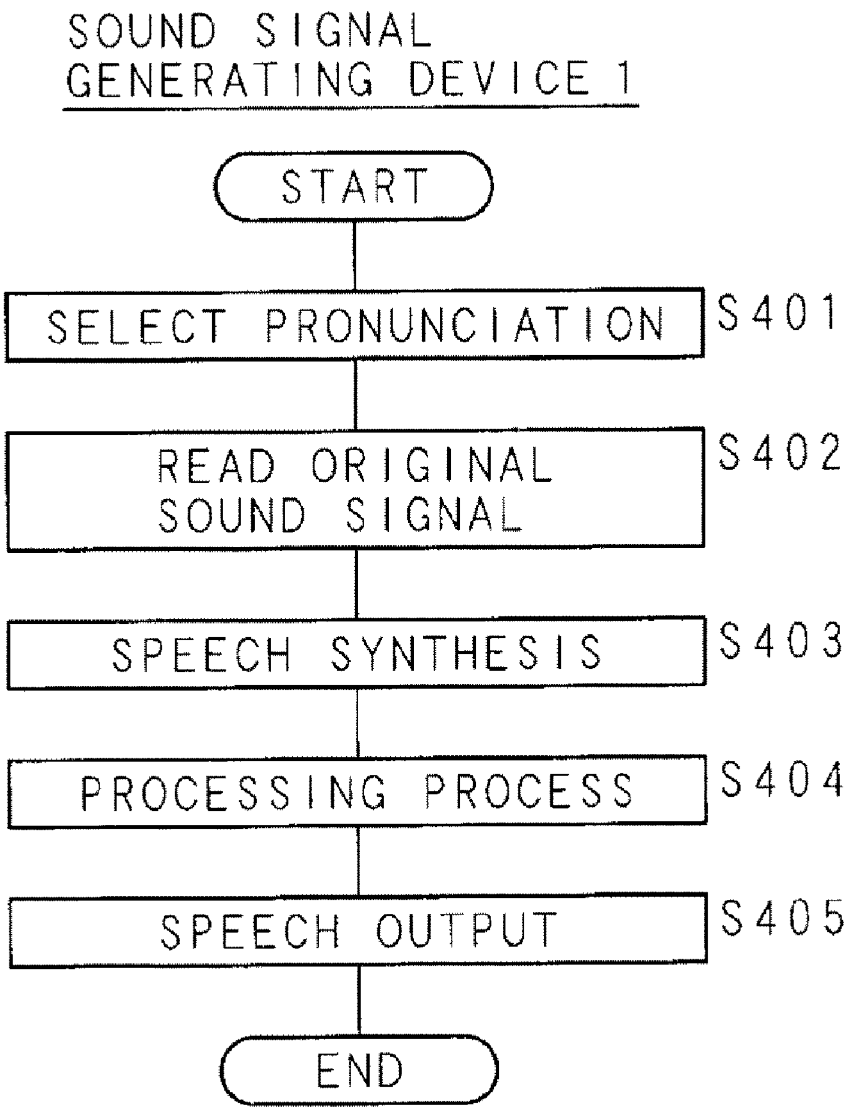
FIG. 9 is an operation chart illustrating one example of a speech output process performed by the sound signal generating device of the present embodiment.

FIG. 9 is an operation chart illustrating one example of the speech output process performed by the sound signal generating device 1 of the present embodiment. Under the control of the controlling section 10 executing the computer program 100 recorded in the recording section 11, the sound signal generating device 1 reads text data and selects a pronunciation of the read text data from the pronunciation database 11*b* (S401), and selects and reads the original sound signal data corresponding to the selected pronunciation from the waveform database 11*a* (S402).

Moreover, under the control of the controlling section 10, the sound signal generating device 1 performs a speech synthesis process for synthesizing a speech signal on the basis of the read original sound signal (S403), and executes a processing process for processing the speech signal synthesized from the original sound signal by the speech synthesis process (S404). The processing process executed at the operation S404 is similar to the processing process explained using FIG. 4, and is a smoothing process for averaging the time changes in the waveform in each length of the speech signal synthesized from the original sound signal. Additionally, the edge process is executed if necessary.

Then, under the control of the controlling section 10, the sound signal generating device 1 outputs speech from the sound output section 14 on the basis of the speech signal of the synthesized speech obtained by performing the processing process (S405). The speech output process on the basis of the uncompressed original sound signal is executed in this manner.

Figure 10:
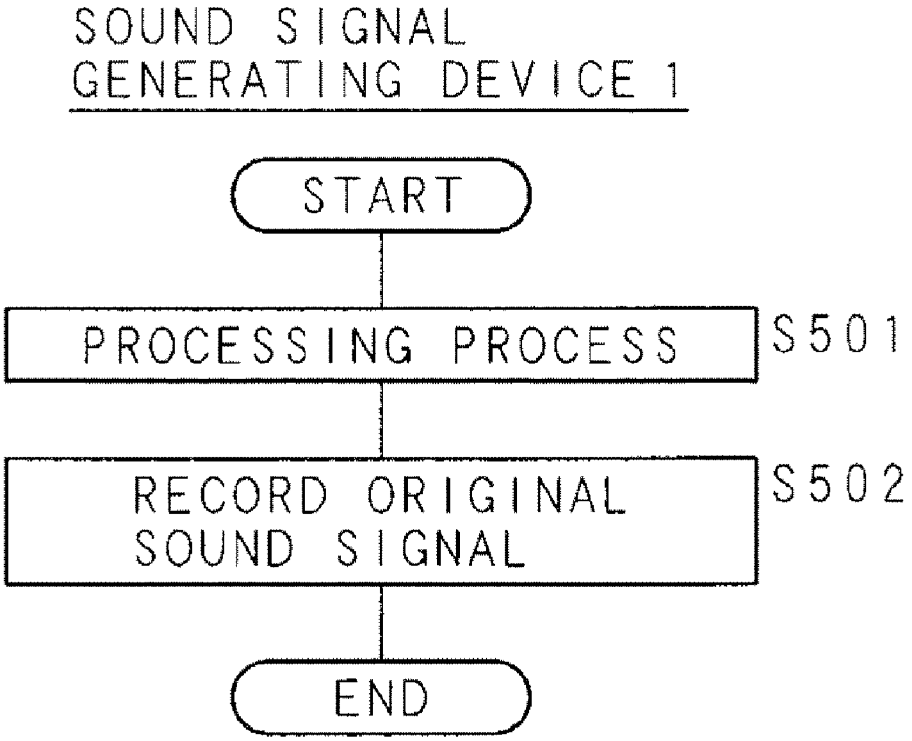
FIG. 10 is an operation chart illustrating a speech segment data generation process performed by the sound signal generating device of the present embodiment.

Further, the sound signal generating device 1 of the present embodiment may also execute the processing process on an original sound signal to be recorded in the waveform database 11*a*. For such a process, the sound signal generating device 1 is implemented using a computer, such as a general-purpose computer. FIG. 10 is an operation chart illustrating a speech segment data generation process performed by the sound signal generating device 1 of the present embodiment. Under the control of the controlling section 10 executing the computer program 100 recorded in the recording section 11, the sound signal generating device 1 executes a processing process on an original sound signal to be recorded as speech segment data (S501), and records the original sound signal after the processing process as speech segment data in the waveform database 11*a* (S502). The processing process executed at the operation S501 is similar to the processing process explained by referring to FIG. 4, and is a smoothing process for averaging the time changes in the waveform in each length of a speech signal synthesized from the original sound signal. Additionally, the edge process is executed if necessary.

The waveform database 11*a* generated in this manner is used in the speech output process illustrated in FIG. 9. However, since the speech segment data on which the processing process has already been performed is recoded, the processing process illustrated at the operation S404 of FIG. 9 is not necessary.

Although the above-described embodiment illustrates a form applied to the synthesized speech output process when reading aloud text data using a voice, the present embodiment is not limited to it and may be applied to speech synthesis in various services, such as automated telephone response services. In other words, the method of implementing the present embodiment is not limited to the above-described embodiment, and may be embodied in various forms to process speech signals.

In the first, second, sixth and seventh aspect, since it is possible to generate a sound signal that does not substantially impair the shape of spectrum envelope of the original sound signal with suppressing sudden changes in the continuous waveforms in each length that cause deterioration in sound quality, the deterioration in sound quality is reducible by a small amount of processing without impairing the original sound quality.

In the third aspect, a discontinuity between adjacent unit waveform signals in the generated continuous waveform signal is prevented by controlling the unit waveform signal to have equal amplitudes at the front edge and rear edge, therefore it is possible to prevent deterioration in sound quality due to the discontinuity in the waveforms.

In the forth aspect, the amplitude in a high-frequency area which is decreased by the smoothing process of superimposing the waveform signals may be enhanced, therefore it is possible to retain the original sound quality.

In the fifth aspect, excessive enhancement of high-frequency areas of voiceless sounds is prevented by performing the high-frequency enhancing process only on a voiced sound which is largely affected by the smoothing process, therefore it is possible to prevent generation of irritable sound due to deterioration in the original sound quality.

The sound signal generating method, sound signal generating device and computer program according to the present embodiment generate a plurality of unit waveform signals by dividing data of an original sound signal such as speech segment data in each length of waveform; generate a repetitive waveform signal for each of the generated unit waveform signals by repeating the waveform of the unit waveform signal a given number of times; and generate a processed sound signal by shifting the respective repetitive waveform signals in each length with a sequence in which the unit waveform signals form the original sound signal and then superimposing on one another.

With this structure, since the process of averaging the time changes in the waveform in each length is performed, the present embodiment enables generation of a sound signal that does not substantially impair the shape of a spectrum envelope of the original sound signal with suppressing sudden changes in the successive waveforms in the each length that cause deterioration in sound quality. As a result, it is possible to reduce deterioration in the sound quality by a small amount of processing without impairing the original sound quality. Accordingly, when synthesizing speech using a database such as a waveform dictionary storing original sound signals, the present embodiment has advantageous effects that noise is eliminated and deterioration in sound quality is prevented without requiring a great processing load. Therefore, compared with the method that eliminates noise by frequency conversion, power consumption required for a computation process to eliminate noise is reducible. Moreover, in the case where the present embodiment may be applied to a waveform dictionary storing an original sound signal by compression, the memory capacity required for the waveform dictionary is reducible, and thus even when the present embodiment may be applied to embedded equipments having great limitations in the memory capacity and the processing ability, such as a cellular phone, it has an advantages effect that deterioration in sound quality may be prevented. Furthermore, the present embodiment has advantageous effects, such as improving the sound quality by elimination of noise contained in the original sound signals in the waveform dictionary.

Moreover, the sound signal generating device and so on according to the present embodiment generate a unit waveform signal having equal amplitudes at the front and rear edges by weighting and combining a plurality of unit waveform signals, and generate a continuous waveform signal by making the generated unit waveform signal continuous.

With this structure, by conforming a amplitude of the unit wave form signal at front edge to a amplitude at rear edge, the present embodiment has advantageous effects, such as enabling to prevent discontinuity in a section where the unit waveform signals are adjoined in the generated continuous waveform signal and deterioration in sound quality due to discontinuity in the waveform.

Further, the sound signal generating device and so on according to the present embodiment perform a high-frequency enhancing process for enhancing the amplitude of a processed sound signal of not less than a given frequency to enhance the amplitude in the high-frequency area which is decreased by the smoothing process of superimposing the waveform signals, and thus have an advantageous effect that the original sound quality is retained.

In particular, when applied to speech synthesis, since the sound signal generating device and son on according to the present embodiment determine whether an original sound signal is a voiced sound or a voiceless sound and perform the high-frequency enhancing process only on a processed sound signal on the basis of an original sound signal determined to be a voiced sound, the high-frequency enhancing process is performed only on a voiced sound that is affected largely by the smoothing process, thus providing advantageous effects, such as preventing excessive enhancement of high-frequency areas of voiceless sounds that leads to irritable sounds due to deterioration in the original sound.

What is claimed is:

1. A sound signal generating method, comprising:

obtaining, using a computer, an original sound signal having a periodic length of repeating similar waveforms;

generating, using a computer, a plurality of unit waveform signals by dividing the obtained original sound signal by the length of the waveform;

generating, using a computer, a first repetitive waveform signal configured by repeating a first unit waveform signal among the plurality of unit waveform signals;

generating, using a computer, a second repetitive waveform signal configured by repeating a second unit waveform signal among the plurality of unit waveform signals; and generating, using a computer, an output sound signal by shifting and then superimposing the first repetitive waveform signal and the second repetitive waveform signal.

2. A sound signal generating device, comprising:

a recording part for recording an original sound signal having a periodic length of repeating similar waveforms;

a reading part for reading the original sound signal recorded in the recording part;

a first generating part for generating a plurality of unit waveform signals by dividing the read original sound signal by the length of the waveform;

a second generating part for generating a first repetitive waveform signal configured by repeating a first unit waveform signal among the plurality of unit waveform signals and generating a second repetitive waveform signal configured by repeating a second unit waveform signal among the plurality of unit waveform signals; and a third generating part for generating an output sound signal by shifting and then superimposing the first repetitive waveform signal and the second repetitive waveform signal.

3. The sound signal generating device according to claim 2, further comprising:

a fourth generating part for controlling to generate the output sound signal in which an amplitude of the first unit waveform is equal to an amplitude of the second unit waveform by weighting and combining the first and second unit waveform signals generated by the first generating part, wherein the second generating part generates the first repetitive waveform signal in which plural first unit waveform signals generated by the first generating part are continuously arranged, and the second repetitive waveform signal in which plural second unit waveform signals generated by the first generating part are continuously arranged.

4. The sound signal generating device according to claim 2, further comprising:

a filter part for performing a high-frequency enhancing process for enhancing amplitude, not less than a given frequency, of an output sound signal.

5. The sound signal generating device according to claim 3, further comprising:

a filter part for performing a high-frequency enhancing process for enhancing amplitude, not less than a given frequency, of an output sound signal.

6. The sound signal generating device according to claim 4, wherein the original sound signal is a speech signal, the sound signal generating device further comprises a part for determining whether the original sound signal is a voiced sound or a voiceless sound, and the filter part performs the high-frequency enhancing process only on an output sound signal based on an original sound signal determined to be a voiced sound.

7. The sound signal generating device according to claim 5, wherein the original sound signal is a speech signal, the sound signal generating device further comprises a part for determining whether the original sound signal is a voiced sound or a voiceless sound, and the filter part performs the high-frequency enhancing process only on an output sound signal based on an original sound signal determined to be a voiced sound.

8. The sound signal generating device according to claim 2, wherein the original sound signal is a speech signal, and the sound signal generating device further comprises a part for outputting speech based on a generated output sound signal.

9. The sound signal generating device according to claim 3, wherein the original sound signal is a speech signal, and the sound signal generating device further comprises a part for outputting speech based on a generated output sound signal.

10. A non-transitory computer-readable recording medium in which program for making the computer generate an output sound signal by processing an original sound signal having a periodic length of repeating substantially similar waveforms, the program comprising:

a step of obtaining, using a computer, the original sound signal;

a step of generating, using a computer, a plurality of unit waveform signals by dividing the obtained original sound signal by the length of the waveform;

a step of generating, using a computer, a first repetitive waveform signal configured by repeating a first unit waveform signal among the plurality of unit waveform signals;

a step of generating, using a computer, a second repetitive waveform signal configured by repeating a second unit waveform signal among the plurality of unit waveform signals; and a step of generating, using a computer, an output sound signal by shifting and then superimposing the first repetitive waveform signal and the second repetitive waveform signal.

* * * * *